US007311846B2

(12) United States Patent
Comer et al.

(10) Patent No.: US 7,311,846 B2
(45) Date of Patent: Dec. 25, 2007

(54) APPARATUS AND METHOD FOR SEPARATING FERROUS AND NON-FERROUS METAL PARTICLES SUSPENDED IN A LIQUID

(75) Inventors: Richard Comer, Georgetown, IN (US); Mark Schroder, Memphis, IN (US)

(73) Assignee: Mann & Hummel GmbH, Ludwigsburg (DE)

(*) Notice: Subject to any disclaimer, the term of this patent is extended or adjusted under 35 U.S.C. 154(b) by 347 days.

(21) Appl. No.: 10/495,579

(22) PCT Filed: Nov. 1, 2002

(86) PCT No.: PCT/US02/35015

§ 371 (c)(1), (2), (4) Date: Nov. 5, 2004

(87) PCT Pub. No.: WO03/043711

PCT Pub. Date: May 30, 2003

(65) Prior Publication Data

US 2005/0045563 A1 Mar. 3, 2005

Related U.S. Application Data

(60) Provisional application No. 60/331,392, filed on Nov. 15, 2001.

(51) Int. Cl.
*B01D 35/06* (2006.01)

(52) U.S. Cl. ...................... 210/695; 210/783; 210/222; 210/396; 210/400; 210/416.1; 210/418; 209/218; 209/226; 209/231; 209/232; 198/690.1; 137/590; 137/592

(58) Field of Classification Search ................ 210/695, 210/783, 396, 400, 416.1, 418, 222; 209/218, 209/226, 231, 232; 198/619, 690, 690.1; 137/590, 592

See application file for complete search history.

(56) References Cited

U.S. PATENT DOCUMENTS

| | | | |
|---|---|---|---|
| 4,154,682 | A | 5/1979 | Matsuoka |
| 4,518,496 | A | 5/1985 | Kanekubo |
| 6,086,761 | A | 7/2000 | Green |

*Primary Examiner*—David A Reifsnyder
(74) *Attorney, Agent, or Firm*—Crowell & Moring LLP

(57) ABSTRACT

A method and apparatus for separating ferrous metal particles from non-ferrous metal particles suspended in a liquid, such as a coolant from a machining operation, in which mixed particle containing liquid is discharged across a horizontal, non-magnetic separating surface; the magnetic ferrous metal particles are captured by a magnetic force exerted by an array of parallel magnets disposed underneath the separating surface, the non-magnetic non-ferrous metal particles are washed by the liquid into a collecting flume from where they can be passed to a filtering station for removal from the liquid, and the captured ferrous metal particles are scraped from the separating surface and conveyed to a ferrous metal discharge by a scraper conveyor which moves transversely to the discharge direction of the liquid.

27 Claims, 3 Drawing Sheets

APPARATUS AND METHOD FOR SEPARATING FERROUS AND NON-FERROUS METAL PARTICLES SUSPENDED IN A LIQUID

BACKGROUND OF THE INVENTION

Modern motor vehicles increasingly incorporate amounts of non-ferrous metals. Aluminum, in particular, is finding increasing application because it combines high strength with low weight. Thus, manufacturing plants for engines, transmissions and other automotive components now commonly have to machine both ferrous metal and non-ferrous metal parts, thereby producing ferrous metal and non-ferrous metal chips.

Sound manufacturing practice calls for the recycling of waste metal. The recycling of aluminum has particular economic significance in view of the substantial amount of energy which is consumed in the production of aluminum.

Since substantially pure metals have much more economic value than mixed metal, it is important to be able to segregate ferrous metal chips from non-ferrous metal chips. One approach for accomplishing this has been to provide separate chip collecting and processing facilities for machine tools that produce ferrous metal parts and for those that produce non-ferrous metal parts. This, however, requires dual or duplicate coolant/lubricant collecting systems and chip filtration and processing systems. Such dual or duplicate systems both waste space and require an increased investment in plant and machinery, with a consequent adverse effect on manufacturing economics.

Attempts have also been made in the past to separate suspended ferrous metal particles from non-ferrous metal particles by using differential settling methods based upon the fact that ferrous metal particles, due to their generally higher density, will settle more rapidly than the lighter non-ferrous metal chips. Such methods, however, have not been effective to achieve the required degree of separation.

Another approach attempted in the prior art has involved collecting both ferrous metal and non-ferrous metal chips together, and then separating the ferrous metal chips from the non-ferrous metal chips, for example by magnetic separators. Such attempts have been less successful than desired because the magnetically collected ferrous metal chips tend to physically trap non-ferrous metal chips so that the desired degree of separation is not achieved.

SUMMARY OF THE INVENTION

It is therefore an object of the invention to provide a method for effectively separating ferrous metal and non-ferrous metal particles entrained in a liquid medium.

It is also an object of the invention to provide a method of separating ferrous metal and non-ferrous metal chips which can achieve a high degree of separation in an economically efficient manner.

A further object of the invention is to provide an improved apparatus for separating ferrous metal and non-ferrous metal particles entrained in a liquid.

An additional object of the invention is to provide an apparatus for separating ferrous metal and non-ferrous metal chips which achieves a high degree of separation with a simple and reliable construction.

In a first aspect of the invention, these and other objects are achieved by providing a method of separating ferrous metal chips from non-ferrous metal chips suspended in a liquid, said method comprising discharging a liquid containing a mixture of suspended ferrous and non-ferrous metal particles from a first side onto a horizontal separating surface of non-magnetic material; capturing and holding ferrous metal particles on said separating surface in a magnetic field exerted by an array of magnets arranged under said separating surface; washing non-ferrous metal particles in said liquid across said separating surface; collecting said liquid containing non-ferrous metal particles at a second side of said separating surface opposite said first side; and scraping the captured ferrous metal particles from said separating surface and conveying the ferrous metal particles to a collecting vessel.

According to a further aspect of the invention, the objects of the invention are achieved by providing an apparatus for separating ferrous metal chips from non-ferrous metal chips suspended in a liquid, said apparatus comprising a horizontal separating surface of non-magnetic material; at least one liquid discharge arranged at a first side of said separating surface for discharging liquid containing a mixture of suspended ferrous and non-ferrous metal chips across said separating surface; a plurality of magnets arranged under said separating surface for capturing ferrous metal chips from said liquid; a collecting flume for collecting liquid and non-ferrous metal chips disposed adjacent a second side of said separating surface opposite said first side, and a conveyor for carrying away captured ferrous metal chips from said separating surface.

BRIEF DESCRIPTION OF THE DRAWINGS

The invention will be described in further detail hereinafter with reference to an illustrative preferred embodiment depicted in the accompanying drawings in which.

DETAILED DESCRIPTION OF PREFERRED EMBODIMENT

Figure 1:
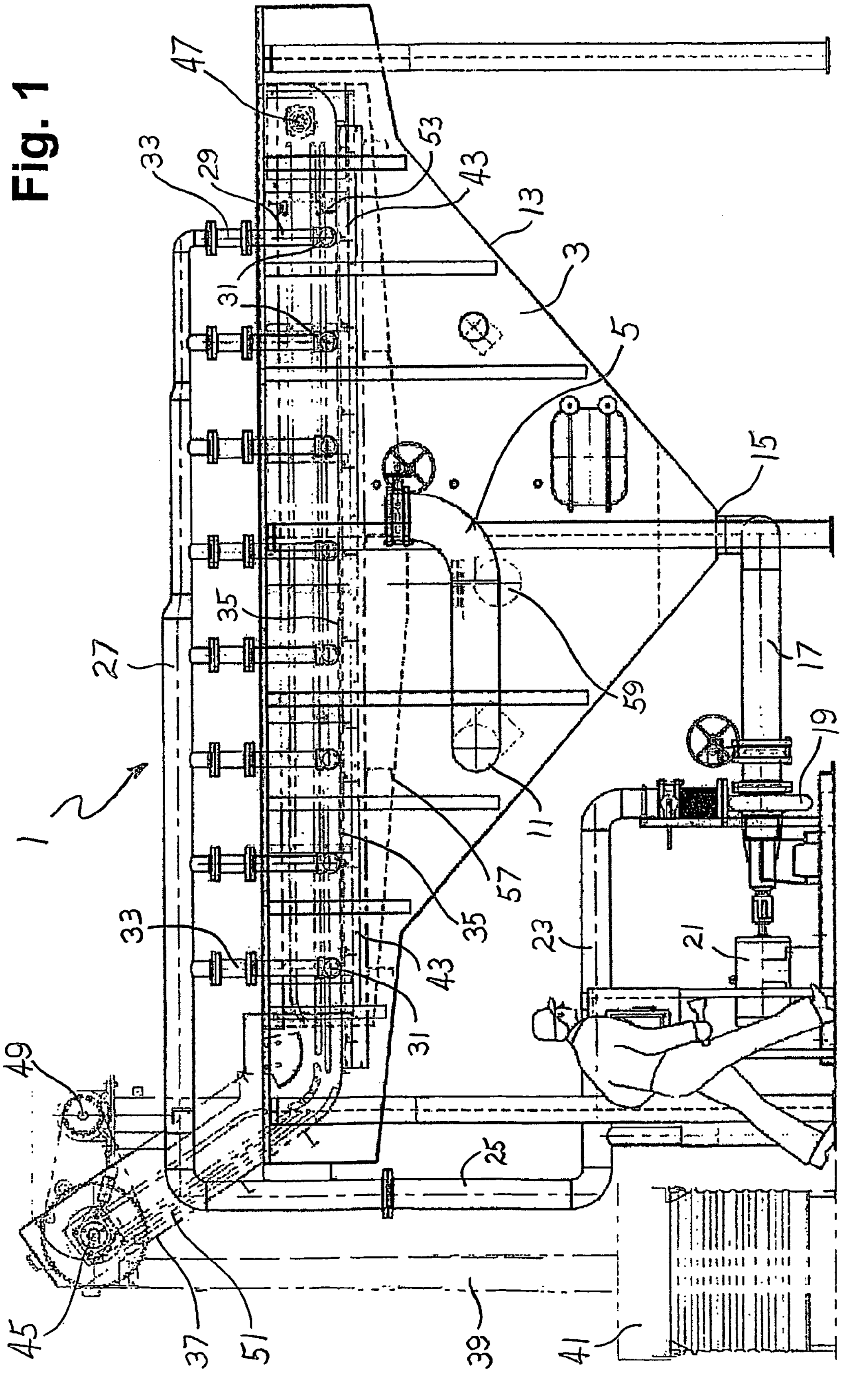
FIG. 1 is a side elevational view of an apparatus for separating ferrous and non-ferrous metal chips according to the present invention.
Figure 2:
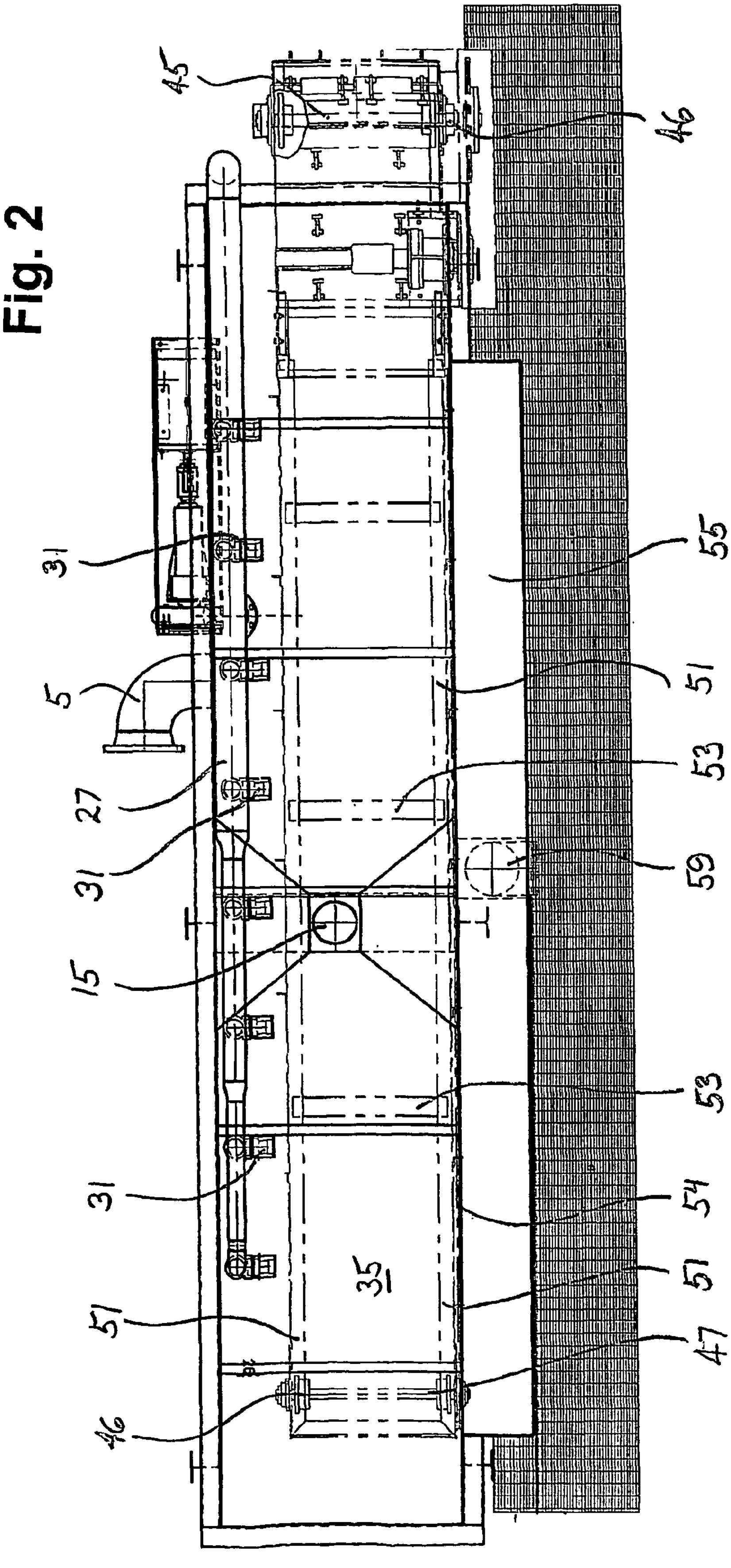
FIG. 2 is a top plan view of the apparatus of FIG. 1.
Figure 3:
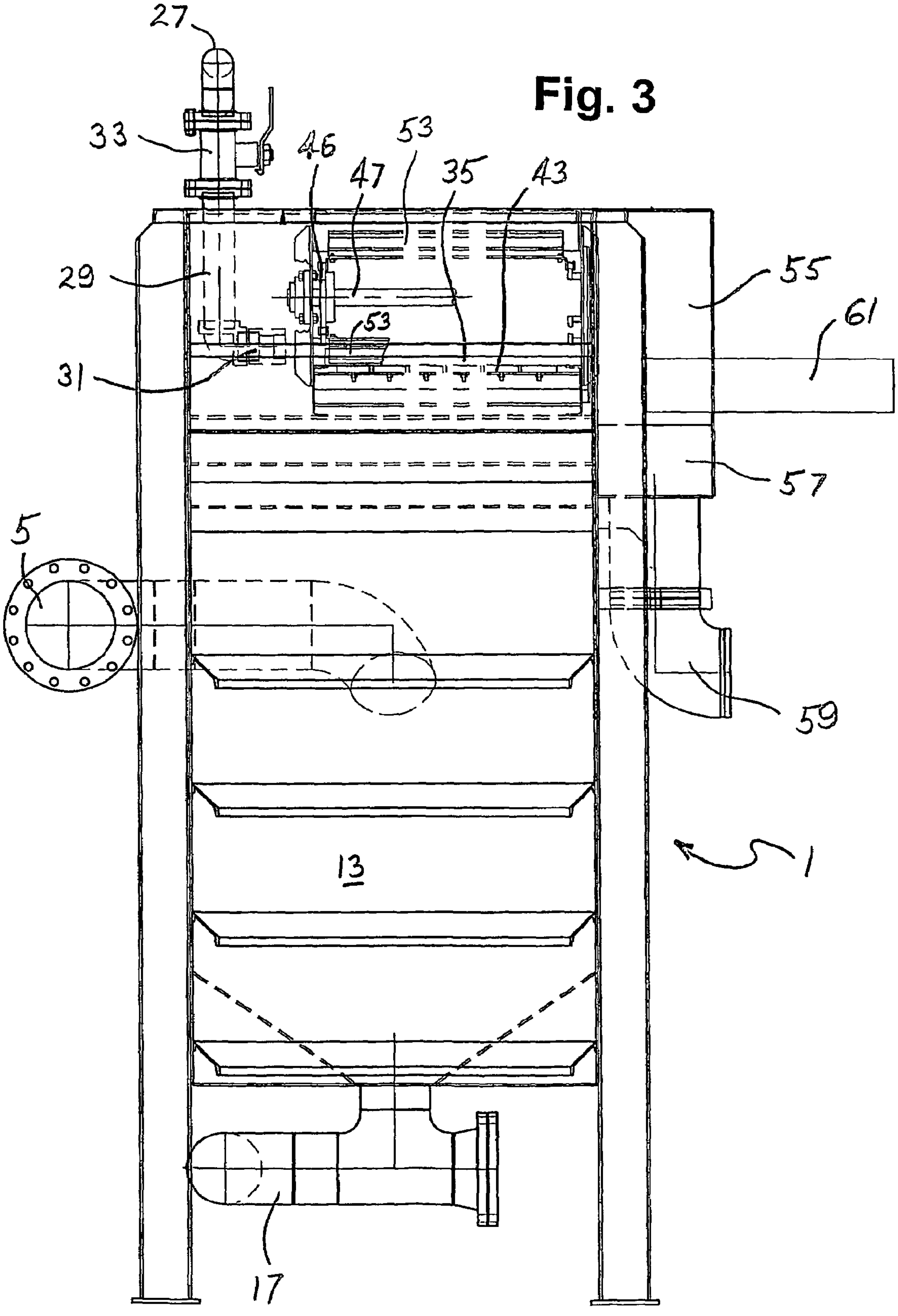
FIG. 3 is an end view of the apparatus.

FIG. 1 shows a side elevational view of a preferred separating apparatus according to the present invention, generally designated by the reference numeral 1. The apparatus comprises a collecting tank or hopper 3. A feed pipe 5, leading from a collecting station (not shown) for coolant from one or more machining operations, leads to an inlet 11 in the side of tank 3 to admit chip-containing coolant to the tank. The bottom 13 of tank 3 is inclined and leads to an outlet 15, which in turn is connected to a discharge pipe 17. A pump 19 on discharge pipe 17 driven, for example, by a motor 21 withdraws collected chip-containing coolant from the tank 3 and pumps it through supply line 23 and riser 25 to a distribution header 27. Header 27, in turn, is connected to a plurality of down lines 29 each terminating in a laterally directed nozzle 31. In the illustrated embodiment eight down lines and nozzles are shown, but it will be appreciated by persons of ordinary skill that a greater or lesser number of down lines and nozzles may be provided. Each down line 29 is provided with a regulating valve 33 which serves to regulate the discharge of chip-containing coolant from the respective nozzle 31.

The nozzles 31 are oriented to discharge chip-containing coolant across a horizontal separating surface 35. The separating surface 35 should be formed of a non-magnetic material, such as stainless steel. The separating surface 35 transitions smoothly at one end into an upwardly inclined discharge surface 37 which terminates at a discharge chute 39 leading to a collecting bin 41.

Underneath separating surface 35 are arranged a plurality of permanent magnets 43. Magnets 43 are preferably arranged in a parallel array so that chip-containing coolant discharged across separating surface 35 will successively traverse the magnetic fields of a plurality of magnets. The side of separating surface 35 opposite nozzles 31 is bounded by a collecting chamber or flume 55 having an inclined bottom 57 leading to a coolant outlet 59. The collecting flume 55 is arranged such that liquid flowing over the edge 54 of separating surface 35 will be captured and directed through outlet 59.

An endless chain conveyor 51 mounted on sheaves 46 on shafts 45 and 47, disposed at respective ends of separating surface 35 is arranged to drag scraper flights along separating surface 35 transversely to the direction of liquid discharge thereover and up inclined discharge surface 37. Like the separating surface 35, the scraper flights 53 are preferably manufactured of a suitable non-magnetic material such as stainless steel. A motor 49 is provided to drive the conveyor system.

The apparatus operates according to the method of the invention as follows:

Contaminated coolant containing suspended ferrous metal and non-ferrous metal chips from machining operations is received through feed line 5 and inlet 11 into tank 3. From the tank, the mixed chip containing coolant is pumped by pump 19 through lines 17, 23 and 25 to distribution header 27. From the header 27, the liquid flows through down lines 29 and is discharged from nozzles 31 across separating surface 35. The magnetic field established by magnets 43 captures ferrous metal particles on separating surface 35. The continued flow of coolant liquid washes non-ferrous metal chips across the separating surface 35 and over edge 54 into collecting chamber 55.

Ferrous metal chips captured by the force of magnets 43 are collected by scrapers 53 pulled by the endless conveyor 51 and drawn up discharge surface 37, from which they pass through discharge chute 39 into collecting vessel 41. The non-ferrous metal chip containing coolant liquid received by collecting chamber 55 is discharged through outlet 59 to a suitable filtration apparatus (not shown) where the non-ferrous metal chips can be separated from the liquid.

Valves 33 can be adjusted as needed to control the rate of liquid discharge across surface 35 so that non-ferrous metal chips are reliably washed out of the magnetically captured ferrous metal chips on the surface. The optimum liquid discharge velocity will vary depending upon the degree of contamination of the coolant liquid with ferrous metal and non-ferrous metal chips, as well as the width of the separating surface. For separating surface widths on the order of 0.75 to 1 meter, good results have been obtained with discharge velocities in the range from about 2 to about 3 meters per second (approx. 7 to 10 feet per second).

The volume of liquid discharged over the separating surface will necessarily vary depending on the size of the separating surface, the strength of the magnets, and the degree of particle contamination in the liquid. The liquid discharge rate should be sufficiently low that the liquid depth does not exceed about 3 centimeters. It is preferred to maintain the liquid depth not more than about 2 centimeters. The amount of liquid, however, should be sufficient to effectively wash non-ferrous metal particles away from captured ferrous metal particles and therefore the minimum liquid depth will ordinarily be at least as high as the depth of the ferrous metal particle accumulations on the surface.

The pitch or spacing of scrapers 53 on endless conveyor 51 and the speed of the conveyor are adjusted to rapidly clear the captured ferrous metal chips from the separating surface, so that there is no buildup of large accumulations of ferrous metal chips in which the non-ferrous metal chips may be trapped. Good results have been achieved with a flight spacing of approximately 13 centimeters (5 inches) and a conveyor speed of about 2 to 5 meters per minute, preferably about 2.5 to 3 meters per minute.

Any desired type of magnet may be used in the apparatus of the invention. It is preferred to use permanent magnets. Particularly good results have been obtained with ceramic magnets of sintered strontium ferrite. Such magnets are commercially available, for example from the Bunting Magnetics Company of Cleveland, Ohio, USA or from the Eriez Magnetic Co. of Erie, Pa., USA. Stainless steel cladding on the back and sides of the magnets may help both to enhance the durability of the magnets and also to channel the magnetic force toward the separating surface. The magnets must be of sufficient strength to capture and hold the magnetic chips against the force of the moving liquid. Good results have been achieved with magnets which exert a magnetic induction in the range from about 1,500 to about 3,000 gauss. In tests of the invention, excellent separation has been achieved with an array of 8 approximately 4 inch wide magnets having a magnetic induction of 2,200 gauss spaced approximately 1 centimeter apart. The magnets should be arranged with the north pole of one proximate the south pole of the adjacent magnet.

The nozzles may be simple pipe nipples of, for example, 2 inch pipe. If desired, threaded connections may be provided so that the nozzles may be conveniently exchanged for nozzles of other sizes. If desired, the nozzles may have a non-circular configuration. For example, it may be advantageous to provide nozzles with an oval outlet opening, with the long axis of the oval arranged parallel to the separating surface to provide a more rapid and even distribution of the chip-containing liquid over the separating surface.

The foregoing description and examples have been set forth merely to illustrate the invention and are not intended to be limiting. Since modifications of the described embodiments incorporating the spirit and substance of the invention may occur to persons skilled in the art, the invention should be construed broadly to include everything within the scope of the appended claims and equivalents thereof.

We claim:

1. An apparatus for separating ferrous metal chips from non-ferrous metal chips suspended in a liquid, said apparatus comprising:

a horizontal separating surface of non-magnetic material;

at least one liquid discharge arranged at a first side of said separating surface for discharging liquid containing a mixture of suspended ferrous and non-ferrous metal chips across said separating surface;

a plurality of magnets arranged under said separating surface for capturing ferrous metal chips from said liquid;

a collecting flume for collecting liquid and non-ferrous metal chips separately from said captured ferrous metal chips, said collecting flume disposed adjacent a second side of said separating surface opposite said first side; and a conveyor for carrying away captured ferrous metal chips from said separating surface.

2. An apparatus according to claim 1, wherein said magnets are arranged successively in a discharge direction of said liquid discharge and parallel to one another.

3. An apparatus according to claim 1, wherein said conveyor moves transversely to a discharge direction of said liquid discharge.

4. An apparatus according to claim 3, wherein said conveyor comprises an endless chain carrying a succession of scraper flights which are drawn across said separator surface toward a ferrous chip discharge.

5. An apparatus according to claim 1, wherein said at least one liquid discharge comprises a plurality of spaced liquid discharge nozzles arranged along said first side of said separating surface.

6. An apparatus according to claim 1, further comprising at least one regulating valve for controlling liquid flow through said liquid discharge.

7. An apparatus according to claim 1, wherein said liquid on said separating surface is maintained at a depth of at most 3 cm.

8. An apparatus according to claim 7, wherein said liquid on said separating surface is maintained at a depth of at most 2 cm.

9. An apparatus according to claim 1, wherein said separating surface is comprised of stainless steel.

10. An apparatus according to claim 1, wherein said magnets are sintered strontium ferrite ceramic magnets.

11. An apparatus according to claim 10, wherein said magnets are stainless steel clad on all sides except the side adjacent said separating surface.

12. An apparatus according to claim 1, wherein said liquid is discharged at a velocity of from about 2 to about 3 meters per second.

13. An apparatus according to claim 1, wherein said magnets exert a magnetic induction of from 2000 to 2500 gauss through said separating surface.

14. A method of separating ferrous metal particles from non-ferrous metal particles suspended in a liquid, said method comprising:

discharging a liquid containing a mixture of suspended ferrous and non-ferrous metal particles at a first side of a horizontal separating surface of non-magnetic material;

capturing and holding ferrous metal particles on said separating surface in a magnetic field exerted by an array of magnets arranged under said separating surface;

collecting said liquid containing non-ferrous metal particles separately from said captured ferrous metal particles at a second side of said separating surface opposite said first side of said separating surface; and scraping the captured ferrous metal particles from said separating surface and conveying the ferrous metal particles to a collecting vessel.

15. A method according to claim 14, wherein said magnets are arranged successively in a discharge direction of said liquid discharge and parallel to one another.

16. An method according to claim 14, wherein said captured ferrous metal particles are scraped from the separating surface by a flight conveyor which moves transversely to a discharge direction of the discharged liquid.

17. A method according to claim 16, wherein said flight conveyor comprises an endless chain carrying a succession of scraper flights which are drawn across said separator surface toward a ferrous chip discharge.

18. A method according to claim 14, wherein said liquid is discharged from a plurality of spaced liquid discharge nozzles arranged along said first side of said separating surface.

19. A method according to claim 14, further comprising regulating the discharge velocity of said liquid to maximize the separation of ferrous and non-ferrous metal particles.

20. A method according to claim 14, wherein said liquid on said separating surface is maintained at a depth of at most 3 cm.

21. A method according to claim 20, wherein said liquid on said separating surface is maintained at a depth of at most 2 cm.

22. A method according to claim 14, wherein said separating surface is comprised of stainless steel.

23. A method according to claim 14, wherein said magnets are sintered strontium ferrite ceramic magnets.

24. A method according to claim 23, wherein said magnets are stainless steel clad on all sides except the side adjacent said separating surface.

25. A method according to claim 14, wherein said liquid is discharged at a velocity of from about 2 to about 3 meters per second.

26. A method according to claim 14, wherein said magnets exert a magnetic induction of from 1500 to 3000 gauss through said separating surface.

27. A method according to claim 26, wherein said magnets exert a magnetic induction of from 2000 to 2500 gauss through said separating surface.

* * * * *